(Model.)
W. ROBINSON.
METHOD OF TREATING GRAPE SUGAR.
No. 269,717. Patented Dec. 26, 1882.
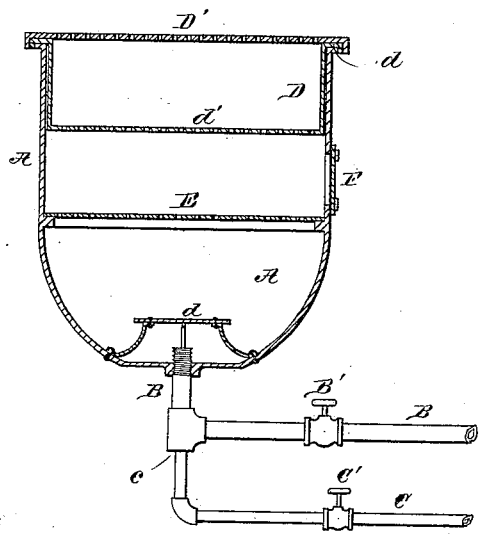
WITNESSES
F. U. Adams
F. W. Kasehagen
INVENTOR
William Robinson
per M. E. Dayton
Attorney

UNITED STATES PATENT OFFICE.

WILLIAM ROBINSON, OF CHICAGO, ILLINOIS.

METHOD OF TREATING GRAPE-SUGAR.

SPECIFICATION forming part of Letters Patent No. 269,717, dated December 26, 1882.

Application filed June 26, 1882. (No model.)

*To all whom it may concern:*

Be it known that I, WILLIAM ROBINSON, of Chicago, in the county of Cook and State of Illinois, have invented certain new and useful Improvements in Methods of Treating Grape-Sugar; and I do hereby declare that the following is a full, clear, and exact description thereof, reference being had to the accompanying drawing, and to the letters of reference marked thereon, which form a part of this specification.

This invention relates to a method and means for removing gluten from sugar made from starch, known as "grape-sugar," and also to a product consisting both of crystallizable and uncrystallizable grape-sugar, wholly or in large part destitute of gluten, whereby said product becomes friable and has relatively small tendency to absorb water.

It is well known that the product of starch known as "grape-sugar, as heretofore usually made, is composed of both uncrystallizable or unconverted sugar, crystallizable (but mainly uncrystallized) sugar, gluten, and other substances, including remnants of acids or other solid impurities left from the process of manufacture. It is also well known that the product mentioned is non-friable or of a waxy or pasty consistency not adapted to be reduced to a granular or pulverulent form, which is the form desired in sugars for commercial and domestic purposes. This waxy property of the sugar is largely due to the presence therein of gluten, which it has heretofore been found impracticable to remove, except by processes or means which are unwarrantably expensive, and which also separate the uncrystallizable sugar, with the gluten, from the crystallizable sugar. The product is thus entirely changed in its composition, and is rendered so expensive as to be commercially valueless.

It is an object of my invention to separate the gluten alone, or together with valueless or objectionable substances, from the sugar, leaving the latter composed of the crystallizable and uncrystallizable sugars, both combined in solid and friable form and with a greatly-diminished tendency to absorb moisture. When this is accomplished the product becomes capable of granulation or pulverization, so as to meet the demands of commerce and domestic use, while at the same time it is not rendered so costly by production as to be unavailable.

It is a further object of my invention to remove with the gluten certain soluble impurities, such as the remnants of acids employed in the manufacture of the sugar, which impart thereto a bitter or otherwise disagreeable and objectionable taste, which cause the sugar to grow dark with age, or which cause the sugar to darken the color of articles of food with which it is used. Accomplishing the removal of these substances is found to also develop the saccharine properties or the sweetness of the product in a degree which fully compensates for its loss in weight occasioned by the abstraction of the substances indicated.

To these several ends my invention consists in the method herein fully explained, and pointed out in the claim.

In the practice of this invention I employ a shallow vessel having a perforated bottom and also a perforated removable cover, said vessel being supported over a chamber, into which is admitted an air-pipe connected with any suitable means for forcing the air through the same, and combined with means for heating the air. A steam-pipe provided with a suitable valve enters the air-pipe and admits any desired amount of steam or moisture to the air-current. The sugar to be treated is taken in the solid form in which it leaves the hands of the manufacturer, and after being cut or shaved into small fragments is confined in the vessel having a perforated top and bottom, said vessel being preferably of such vertical dimensions as to give, when full, the proper depth of sugar to allow the forced current of air to pass rapidly through the same, the cover being arranged to set down in contact or proximity with the body of sugar, so as to confine the same.

In the drawing are shown the elements of a device suitable for the practice of my invention, A being a stationary vessel or chamber open at the top and having the air-pipe B inserted through the bottom thereof, as shown, a horizontal deflecting-plate, *a*, being arranged over the mouth of the air-pipe, as indicated.

C is a steam-pipe, which enters the air-pipe at *c*, and which is provided with a valve, C'.

D is a shallow vessel for holding the sugar to be treated, said vessel having a flange, d, which rests upon the rim of the vessel A, and having a perforated bottom, d', and a removable perforated cover, D'. This vessel D should be about six to eight inches in depth, and may be of any desired lateral dimensions, and should be evenly filled with sugar before the application of the cover D'.

In the operation of this machine for the purposes of my invention a forcible blast of air, heated to a temperature of, say, 100° to 130° Fahrenheit, is injected into the chamber A through the pipe B, and the desired quantity of steam is admitted to said air-blast through the pipe C. The object of combining air with the steam is to prevent the steam from melting or liquefying the sugar, while permitting it to accomplish the desired effect—namely, to vaporize the gluten and more readily soluble impurities, which, by the force and volume of the air-blast, are carried away in the form of vapor through the perforated cover D. If the steam be admitted alone and in sufficient volume and force, it is calculated to soften the entire mass; but if admitted in only moderate quantity and mingled with the strong air-blast the latter prevents this action of the steam, and serves to carry away the dissolved gluten and impurities as fast as vaporized or softened and taken up by the steam. The blast of combined air and steam or of moistened air is usually continued from fifteen to twenty minutes, at the expiration of which time the steam is cut off and the air-blast alone is continued, thereby forcing all the moisture out of the sugar and leaving the same dry and friable. The temperature at which the air is employed is higher than that at which the sugar would ordinarily melt; but this effect is not produced, owing to the force with which the air is passed through the mass. The residual sugar product left in the perforated vessel, after being treated to the moistened-air blast, as described, will usually be found reduced in weight from five to fifteen per cent., according to the original quality of the sugar; but the saccharine principle or sweetness of the mass will be materially developed, so as to fully or more than compensate for this loss. Careful tests have demonstrated that none of the saccharine properties of the mass so treated are removed by its subjection to the moistened-air current in the manner described. Not only is the color of the sugar thus treated in some degree improved and rendered permanent, but the tendency of the sugar to discolor articles of food with which it is used will be entirely removed, as are also the bitter or other unpleasant tastes which characterize the original sugar before being so treated. The product, after the treatment described, possesses a solid uncrystalline friable form, as stated, and may be crushed to any desirable degree of fineness.

Instead of or in connection with steam as a means of moistening the air-blast, other vapors may be employed, certain of which—as that of alcohol—being specially adapted to the solution and removal of the matters which impart the bitter taste to the sugar. As an auxiliary of steam but a very small amount of alcohol is required for this purpose.

In the drawing I have shown a perforated diaphragm, E, located in the vessel A, at a little distance below the bottom of the vessel D, and a door, F, through the side of the vessel A, giving access to the space intervening between the vessel D and the diaphragm E. This construction allows sponges saturated with a liquid or liquids to be vaporized to be placed on the diaphragm E in the course of the air-current, and to be removed when the desired effect is obtained. An ounce of alcohol for every ten pounds of sugar being treated, used in connection with steam and applied in an air-blast, as set forth, is found to be sufficient to wholly remove the bitter taste referred to in the crude sugar.

I claim as my invention—

The method of purifying previously-solidified grape-sugar, which consists in first reducing the solid body of sugar to small fragments, then passing through the mass of fragments, by means of a forcible current of heated air, a vapor capable of taking up the impurities to be removed, and thereafter drying the mass, substantially as described.

In testimony that I claim the foregoing as my invention I affix my signature in presence of two witnesses.

WILLIAM ROBINSON.

Witnesses:
M. E. DAYTON,
JESSE COX, Jr.